(12) United States Patent
Heo

(10) Patent No.: US 12,415,435 B2
(45) Date of Patent: Sep. 16, 2025

(54) METHOD, DEVICE AND SYSTEM OF CONTROLLING CHARGING AND DISCHARGING VEHICLES THROUGH CHARGING STATION

(71) Applicant: AEONUS CO., LTD, Suwon-si (KR)

(72) Inventor: Eun Heo, Yongin-si (KR)

(73) Assignee: AEONUS CO., LTD, Suwon-si (KR)

( * ) Notice: Subject to any disclaimer, the term of this patent is extended or adjusted under 35 U.S.C. 154(b) by 549 days.

(21) Appl. No.: 17/927,354

(22) PCT Filed: Jun. 17, 2021

(86) PCT No.: PCT/KR2021/007629
§ 371 (c)(1),
(2) Date: Nov. 22, 2022

(87) PCT Pub. No.: WO2022/181896
PCT Pub. Date: Sep. 1, 2022

(65) Prior Publication Data
US 2023/0211690 A1 Jul. 6, 2023

(30) Foreign Application Priority Data
Feb. 24, 2021 (KR) .................. 10-2021-0025011

(51) Int. Cl.
*B60L 53/62* (2019.01)
*B60L 53/16* (2019.01)
(Continued)

(52) U.S. Cl.
CPC .............. *B60L 53/62* (2019.02); *B60L 53/16* (2019.02); *B60L 53/65* (2019.02); *B60L 53/80* (2019.02);
(Continued)

(58) Field of Classification Search
CPC .......... B60L 53/00; B60L 53/10; B60L 53/11; B60L 53/126; B60L 53/30; B60L 53/305;
(Continued)

(56) References Cited

U.S. PATENT DOCUMENTS

| 6,034,507 A | 3/2000 | Ikawa et al. | |
|---|---|---|---|
| 2016/0190825 A1* | 6/2016 | Lih | H02J 7/007194 320/152 |
| 2020/0039153 A1* | 2/2020 | Giurgiutiu | B29C 66/72141 |

FOREIGN PATENT DOCUMENTS

| CN | 107064806 A | * | 8/2017 | ........... G01R 31/367 |
|---|---|---|---|---|
| CN | 112572233 A | * | 3/2021 | .............. B60L 58/12 |

(Continued)

OTHER PUBLICATIONS

International Search Report in International Application No. PCT/KR2021/007629, dated Nov. 19, 2021, 3pages.

*Primary Examiner* — Rexford N Barnie
(74) *Attorney, Agent, or Firm* — Park, Kim & Suh, LLC

(57) ABSTRACT

Provided is a method of controlling charging and discharging vehicle through a charging station executed by a control device. The method includes: when a first vehicle placed in a first charging station is released, identifying the time the first vehicle is released and a residual quantity of the battery and renewing state information of the first vehicle; when the first vehicle is returned to the first charging station, identifying the time the first vehicle is returned and a residual quantity of the battery and renewing state information of the first vehicle; comparing the residual quantity of the battery identified when the first vehicle is released to the residual quantity of the battery identified when the first vehicle is returned based on the state information of the first vehicle and calculating the amount of the battery used in the first vehicle; estimating and calculating an aging degree of the battery of the first vehicle based on the number of times the (Continued)

battery of the first vehicle is charged and discharged and the amount of the battery of the first vehicle used, after charging and discharging detail is identified through the state information of the first vehicle; setting a charging upper limit and a discharging lower limit for the battery of the first vehicle based on the battery aging degree of the first vehicle; and determining whether the battery of the first vehicle needs to be replaced based on the charging upper limit and the discharging lower limit.

3 Claims, 8 Drawing Sheets

(51) Int. Cl.
    *B60L 53/65*     (2019.01)
    *B60L 53/80*     (2019.01)
    *B60L 58/12*     (2019.01)
    *B60L 58/16*     (2019.01)

(52) U.S. Cl.
    CPC ............... *B60L 58/12* (2019.02); *B60L 58/16* (2019.02); *B60L 2200/12* (2013.01); *B60L 2200/24* (2013.01)

(58) Field of Classification Search
    CPC .......... B60L 53/50; B60L 53/60; B60L 53/64; B60L 53/65; B60L 53/66; B60L 53/80; B60L 58/00; B60L 58/10; B60L 58/12; B60L 58/16; B60L 2200/12; B60L 2200/24; H02J 7/00032; H02J 7/00034; H02J 7/00036; H02J 7/00041; H02J 7/0044; H02J 7/0047; H02J 7/0048; H02J 7/0049; H02J 7/005
    USPC ........ 320/109, 111, 113, 124, 127, 128, 132, 320/149, 150, 160; 307/9.1, 10.1
    See application file for complete search history.

(56) References Cited

FOREIGN PATENT DOCUMENTS

| | | | | |
|---|---|---|---|---|
| DE | 102013017398 A1 | * | 4/2015 | ............ H01M 10/44 |
| JP | 2743686 B2 | | 4/1998 | |
| JP | 11-098699 A | | 4/1999 | |
| JP | 2017-022918 A | | 1/2017 | |
| KR | 10-1608987 B1 | | 4/2016 | |
| KR | 10-2018-0047271 A | | 5/2018 | |
| KR | 10-2019-0091796 A | | 8/2019 | |
| KR | 10-2019-0099798 A | | 8/2019 | |
| KR | 20190124032 A | * | 11/2019 | ............. B60L 53/60 |
| KR | 20200039153 | * | 4/2020 | ............. B60L 53/60 |
| KR | 10-2020-0124621 A | | 11/2020 | |
| KR | 10-2255771 B1 | | 5/2021 | |

* cited by examiner

METHOD, DEVICE AND SYSTEM OF CONTROLLING CHARGING AND DISCHARGING VEHICLES THROUGH CHARGING STATION

CROSS-REFERENCE TO RELATED APPLICATIONS

This application is the National Stage filing under 35 U.S.C. 371 of International Application No. PCT/KR2021/007629, filed on Jun. 17, 2021, which claims the benefit of Korean Patent Application No. 10-2021-0025011, filed on Feb. 24, 2021, the contents of which are all hereby incorporated by reference herein in their entirety.

TECHNICAL FIELD

The present invention relates to a technology of controlling charging and discharging vehicles through a charging station formed of a cradle.

BACKGROUND ART

Recently, as various last mile services have been introduced, electric scooter services have become popular these days. However, the electric scooters left on the street are increased and thereby, are causing inconvenience to pedestrians.

Also, as scooters need to be collected for charging, a lot of expense is required to collect scooters spread to various places and thereby, a deficit of business operators also increases.

On the other hand, the public bike rental service provides rental and return of bikes at a designated place and this allows a profit structure.

Accordingly, in order to secure safety of pedestrians, to reduce the costs for business operators, and to streamline the management, there is a demand for the development of a charging station for micro mobility such as scooters to allow people to rent and return scooters only at the charging station.

PRIOR ART DOCUMENTS

Patent Documents (Patent Documents 1) Korean Patent No. 10-1608987 (2016.04.04)
(Patent Documents 2) Korean Patent Application Publication No. 10-2019-0099798 (2019.08.28)
(Patent Documents 3) Korean Patent Application Publication No. 10-2020-0124621 (2020.11.03)
(Patent Documents 4) Korean Patent Application Publication No. 10-2018-0047271 (2018.05.10)

DISCLOSURE

Technical Problem

The present invention provides a method, a device, and a system of managing a battery of a vehicle in which detail of charging and discharging the battery is identified through state information of a first vehicle placed in a first charging station, then an aging degree of the battery of the first vehicle is estimated and calculated based on the number of times the battery of the first vehicle is charged and discharged and the amount of the battery of the first vehicle used, and then, a charging upper limit and a discharging lower limit of the battery of the first vehicle are set.

The object of the present invention is not limited to the above-mentioned object, and other objects not mentioned will be clearly understood from the following description.

Technical Solution

According to an aspect of the present invention, there is provided a method of controlling charging and discharging vehicle through a charging station executed by a control device including: when a first vehicle placed in a first charging station is released, identifying the time the first vehicle is released and a residual quantity of the battery and renewing state information of the first vehicle; when the first vehicle is returned to the first charging station, identifying the time the first vehicle is returned and a residual quantity of the battery and renewing state information of the first vehicle; comparing the residual quantity of the battery identified when the first vehicle is released to the residual quantity of the battery identified when the first vehicle is returned based on the state information of the first vehicle and calculating the amount of the battery used in the first vehicle; estimating and calculating an aging degree of the battery of the first vehicle based on the number of times the battery of the first vehicle is charged and discharged and the amount of the battery of the first vehicle used, after charging and discharging detail is identified through the state information of the first vehicle; setting a charging upper limit and a discharging lower limit for the battery of the first vehicle based on the battery aging degree of the first vehicle; and determining whether the battery of the first vehicle needs to be replaced based on the charging upper limit and the discharging lower limit.

The method may further include: when user identification information is obtained through local area wires communication between local area communication devices installed in a first area of the first charging station where the first vehicle is placed, and a user terminal, executing user authentication based on the user identification information; when it is identified that the user authentication is successful, unlocking an automatic locking device where the first vehicle is placed; when it is identified that a charging plug connected to the first vehicle is connected to a dummy socket installed to the first area, determining that the first vehicle is released and carried out; and when it is identified that the charging plug connected to the dummy socket installed to the second area of the first charging station, where a vehicle is not placed, is connected to the first vehicle, determining that the first vehicle is entered and returned.

The method may further include: obtaining a sensing value from an acceleration sensor installed to the first charging station; when it is identified that the sensing value is greater than a preset first reference value, determining that an average level of impact is applied to the first charging station and obtaining and storing video information taken around the time the sensing value is obtained; and when it is identified that the sensing value is greater than a preset second reference value, determining that strong impact is applied to the first charging station, stopping the use of the mobile battery installed to the first charging station, and transmitting a warning message of the first charging station to a terminal of a manager.

The method may further include: when a request for renting a vehicle placed in the first charging station is received from a user terminal, identifying a residual quantity of battery for each vehicle placed in the first charging station and identifying whether a fully-charged vehicle exists; when it is identified that the first vehicle is fully-charged as a result of the identification on existence of the fully-charged vehicle, transmitting a message informing that rental of the first vehicle placed in the first area of the first charging station is available to the user terminal; when it is identified that the fully-charged vehicle does not exist in the first charging station as a result of the identification on existence of the fully-charged vehicle, identifying the first vehicle having the largest residual quantity of the battery from among the vehicles placed in the first charging station; when it is identified that the residual quantity of the battery of the first vehicle is greater than a preset reference charging amount, determining that the first vehicle is immediately used and transmitting a message informing that rental of the first vehicle is available to the user terminal; when it is identified that the residual quantity of the battery of the first vehicle is less than the reference charging amount, determining that the first vehicle may not be immediately used and estimating and calculating the charging time required for the battery of the first vehicle to reach the reference charging amount by using the residual quantity of the battery of the first vehicle; when it is identified that the charging time is shorter than preset reference time, transmitting a message informing that rental of the first vehicle is available after waiting for the charging time to the user terminal; and when it is identified that the charging time is longer than preset reference time, transmitting a message to the user terminal, wherein the message informs the user to move to the second charging station through the first vehicle to rent the second vehicle placed in the second charging station.

The method may further include: performing a health check for the local storage by checking at least one of a checklist including power abnormality of the control device, defective connection, network connection, and a spare space of the local storage, in order to check a storing state of the local storage for each predetermined period; and when it is determined that the local storage is abnormal as a result of the health check, performing duplexing to store the data stored in the local storage in a cloud storage of a cloud server connected to the control device as a backup, wherein the performing duplexing includes: identifying data transmission speed between the control device and the cloud server; when it is identified that the data transmission speed is above preset reference speed, transmitting the data stored in the local storage to the cloud server and controlling the data stored in the local storage to be stored in the cloud storage as a backup; when it is identified that the data transmission speed is below the reference speed, determining whether the data of the local storage is transmitted, as a result of the health check; when the local storage is classified as the warning state, controlling the data stored in the local storage not to be transmitted to the cloud server and to wait until the data transmission speed is changed to above the reference speed; and when the local storage is classified as the dangerous state, controlling the data stored in the local storage to be transmitted to the cloud server even if the data transmission speed is below the reference speed.

Advantageous Effects

According to an embodiment of the present invention, when the detail of charging and discharging the battery is identified through the state information of the first vehicle placed in the first charging station, an aging degree of the battery of the first vehicle is estimated and calculated based on the number of times the battery of the first vehicle is charged and discharged and the amount of the battery of the first vehicle used, a charging upper limit and a discharging lower limit of the battery of the first vehicle are set according to the aging degree of the battery of the first vehicle, and thereby, the battery of the vehicle is managed. Accordingly, there is an increasing effect in safety of pedestrians, cost reduction for business operators, and operating rationalization for sharing service.

The effects according to the embodiments of the present invention are not limited to those described above and other undescribed effects will be clearly understood by those of ordinary skill in the art from the description here.

DETAILED DESCRIPTION OF THE INVENTION

Figure 1:
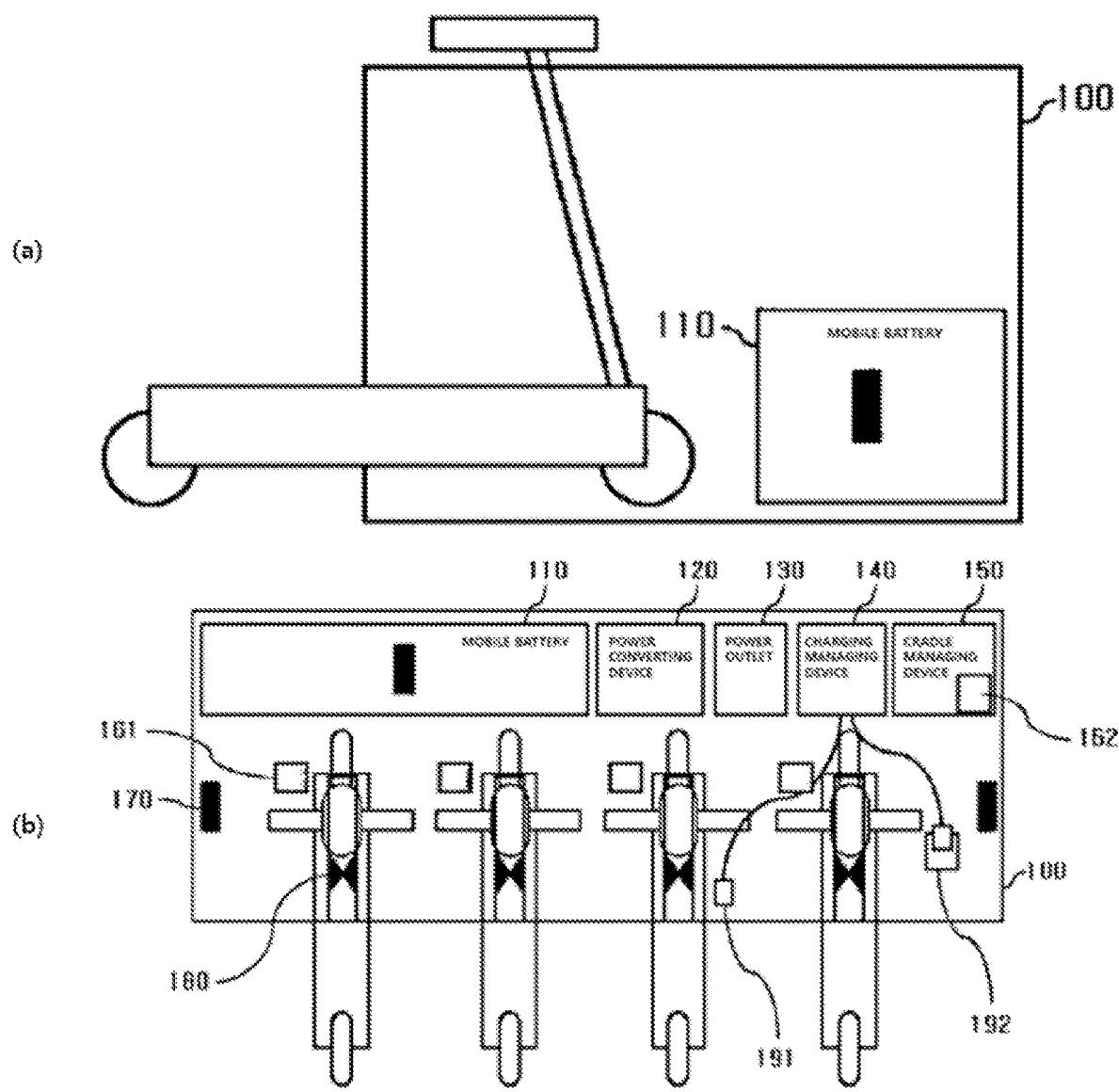
FIG. 1 schematically illustrates a system of a charging station for controlling charging and discharging of a vehicle according to an embodiment of the present invention.

Hereinafter, embodiments of the present invention will be described in more detail with reference to the accompanying drawings. The present invention may, however, be embodied in many different forms and should not be construed as being limited to the embodiments set forth herein. It should be understood that all modifications, equivalents, and alternatives of the exemplary embodiments are within the scope of the invention.

Specific structural and functional details disclosed herein are merely representative for purposes of describing exemplary embodiments. Accordingly, this invention may be embodied in many alternate forms. Exemplary embodiments are not limited to the specific form illustrated hereinafter, and the embodiments of the present invention are to cover all modifications, equivalents, and alternatives falling within the scope of the invention.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be understood that when an element is referred to as being "connected to" another element, it may be directly connected to the other element or intervening elements may be present.

The terminology used herein is for the purpose of describing only and is not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Also, like reference numerals in the drawings denote like elements. In the description, the detailed descriptions of well-known technologies and structures may be omitted so as not to hinder the understanding of the present invention.

Embodiments of the present invention may be embodied in various forms of products such as personal computers, laptop computers, tablet computers, smart phones, televisions, smart home appliances, intelligent vehicles, kiosks, and wearable devices.

FIG. 1 schematically illustrates a system of a charging station for controlling charging and discharging of a vehicle according to an embodiment of the present invention.

More specifically, FIG. 1(a) is a side view of a charging station and FIG. 1(b) is a plan view of a charging station.

The charging station may provide a function of charging power to batteries of vehicles, in particular, micro mobility such as electric scooters, motor scooters, hoverboards, and electric wheels.

As illustrated in FIG. 1, the charging station may be formed of a cradle 100, wherein the cradle 100 may include a mobile battery 110, a power converting device 120, a power outlet 130, a charging managing device 140, a cradle managing device 150, local area communication devices 161 and 162, acceleration sensors 170, automatic locking devices 180, charging plugs 191, dummy sockets 192 and may further include a wireless communication module and a camera module.

The mobile battery 110 may be replaceable and include the acceleration sensor 170 attached thereon so that impact applied while moving may be recorded and stored in the mobile battery 110.

The power converting device 120 may convert power so that power stored in the mobile battery 110 may be supplied to a battery of a vehicle.

The power outlet 130 may be embodied as a withdrawable part through which the cradle 100 is connected to an external outlet and thereby, electricity may be supplied to the cradle 100.

The charging managing device 140 is connected to the mobile battery 110. When the mobile battery 110 is withdrawn or fastened, the charging managing device 140 may obtain impact-recorded data stored in the mobile battery 110 at once and may transmit the impact-recorded data to a control device for controlling the cradle 100.

The cradle managing device 150 is a control device for controlling the entire operations of the cradle 100 and may be included in the cradle 100. However, the present invention is not limited thereto and the cradle managing device 150 may be embodied as a separate device connected to the cradle 100.

The local area communication devices 161 and 162 may be embodied as receivers of local area wireless communication such as BLE and NFC and may be respectively installed in each area where vehicles are placed. For example, the first local area communication device 161 may be a device for receiving data through BLE and the second local area communication device 162 may be a device for receiving data through NFC.

The acceleration sensor 170 may be attached to the mobile battery 110 or a part of the cradle 100 and may generate a sensing value based on a result obtained by sensing acceleration occurring due to impact applied to the mobile battery 110 or the cradle 100.

The automatic locking devices 180 may be installed in each area where vehicles are placed to be locked and may be unlocked after user authentication is completed.

The charging plugs 191 may be installed in each area where vehicles are placed to charge batteries. When the charging plug 191 is connected to a vehicle, power may be supplied to a battery of the vehicle and when the charging plug 191 is disconnected from the vehicle, power may not be supplied to the battery of the vehicle any longer.

The dummy sockets 192 may be installed in each area where vehicles are placed to be released. That is, when the charging plug 191 is disconnected from the vehicle to rent the vehicle and then, the dummy socket 192 is connected to the charging plug 191, it may be identified that the vehicle at the corresponding area is released.

Figure 2:
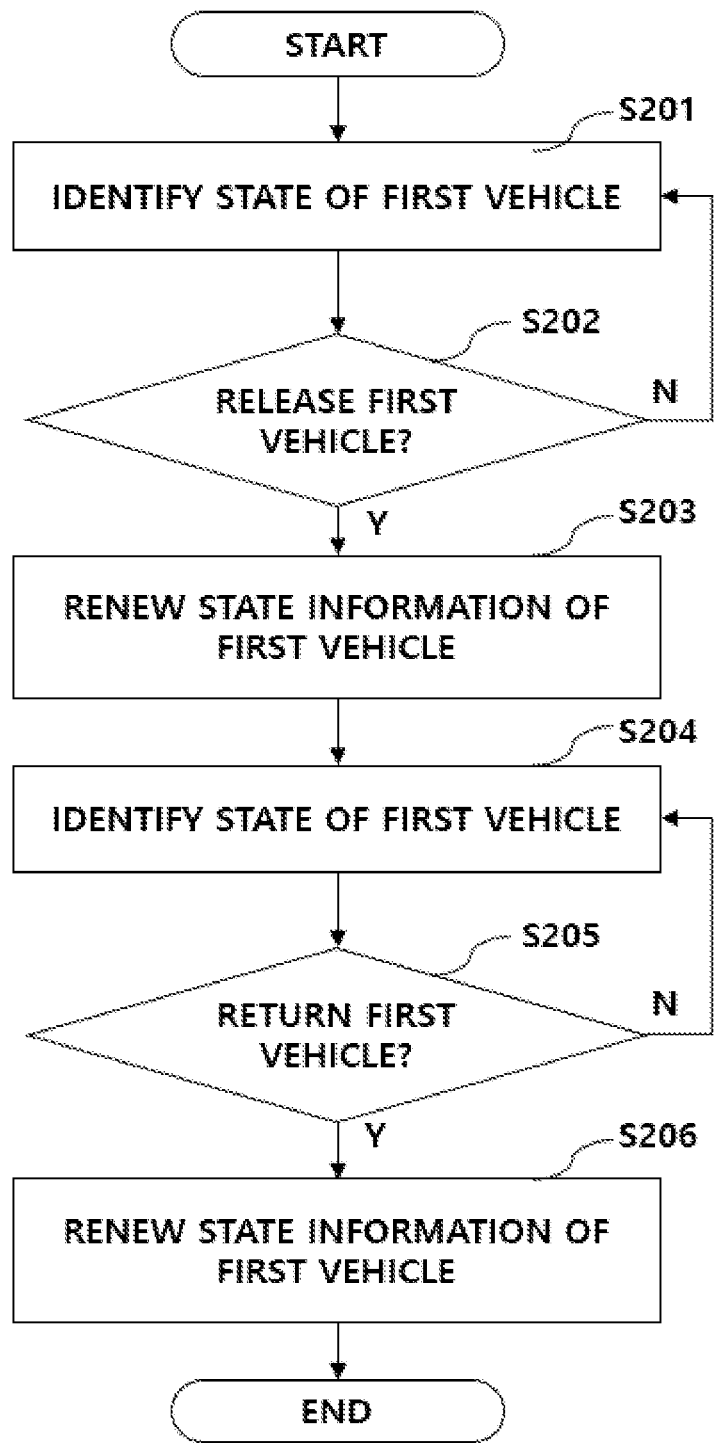
FIG. 2 is a flowchart illustrating renewing state information of a vehicle according to an embodiment of the present invention.

FIG. 2 is a flowchart illustrating renewing state information of a vehicle according to an embodiment of the present invention.

According to an embodiment of the present invention, the charging station formed of the cradle 100 may be arranged and installed in each area. For example, a first charging station may be installed in area A and a second charging station may be installed in area B.

A plurality of charging stations installed in each area may be connected to a control device through wire and wireless communication, wherein the control device may control each operation of the plurality of charging stations.

The control device may be an own server owned by a person or a group who provides the service by using the control device, a cloud server, or a peer-to-peer (p2p) group of dispersed nodes. The control device may be configured to execute all functions or a part of functions included in a common computer such as calculation, storing/referring, input/output, and control.

Referring to FIG. 2, the control device may identify the state of a first vehicle placed in the first charging station, in operation S201.

For example, when the charging plug 191 installed in a first area of the first charging station is connected to the first vehicle placed in the first area, the control device may identify the state that the first vehicle is placed and is on standby in the first area of the first charging station. Here, when the first vehicle is not fully charged, power may be applied to the battery of the first vehicle and thereby, the battery of the first vehicle may be charged.

The control device may identify whether the first vehicle is released, in operation S202. That is, when the charging plug 191 is disconnected from the first vehicle and the dummy socket 192 installed in the first area is connected to the charging plug 191, the control device may identify that the first vehicle is released.

When it is identified that the first vehicle is not released, in operation S202, the control device may identify and monitor the state of the first vehicle until the first vehicle is released, back in operation S201.

When it is identified that the first vehicle is released, in operation S202, the control device may renew state information of the first vehicle after identifying the time the first vehicle is released and a residual quantity of the battery, in operation S203.

More specifically, the control device may record and store state information of each vehicle in database. When it is identified that the first vehicle is released, the control device may renew state information of the first vehicle to add information about the identified time the first vehicle is released and a residual quantity of the battery to the state information of the first vehicle.

The control device may identify the state of the first vehicle released from the first charging station, in operation S204. Here, the control device may obtain location information from the first vehicle and may identify whether the current state of the first vehicle is on loan.

The control device may identify whether the first vehicle is returned to the first charging station, in operation S205.

For example, the first vehicle is not placed in the first area and thereby, the dummy socket 192 and the charging plug 191 are connected to each other in the first area. Here, when the dummy socket 192 is disconnected from the charging plug 191 in the first area and the charging plug 191 is connected to the first vehicle, the control device may identify that the first vehicle is returned.

According to an embodiment of the present invention, the first vehicle released from the first charging station needs to be returned to the charging station. However, the present invention is not limited thereto and the first vehicle released from the first charging station may be returned to the second charging station.

When it is identified that the first vehicle is not returned, in operation S205, the control device may track and identify the state of the first vehicle until the first vehicle is returned, back in operation S204.

When it is identified that the first vehicle is returned, in operation S205, the control device may identify the time the first vehicle is returned and a residual quantity of the battery and may renew the state information of the first vehicle, in operation S206.

More specifically, the control device may obtain the state information of the first vehicle from the database. When it is identified that the first vehicle is returned, the control device may renew the state information of the first vehicle to add information about the identified time the first vehicle is returned and a residual quantity of the battery to the state information of the first vehicle.

According to an embodiment of the present invention, the control device may record the number of times the batteries are charged and discharged and the state of the batteries for each vehicle placed in the charging stations, may store the state information of the vehicles, and may transmit the state information of the vehicles to a cloud server connected to the control device.

That is, the control device may record and store the returned time and a residual quantity of the battery for each vehicle ID when the vehicles are returned, may record and store the released time and a residual quantity of the battery for each vehicle ID when the vehicles are released, and may transmit and share the stored state information of the vehicles to a cloud server.

Figure 3:
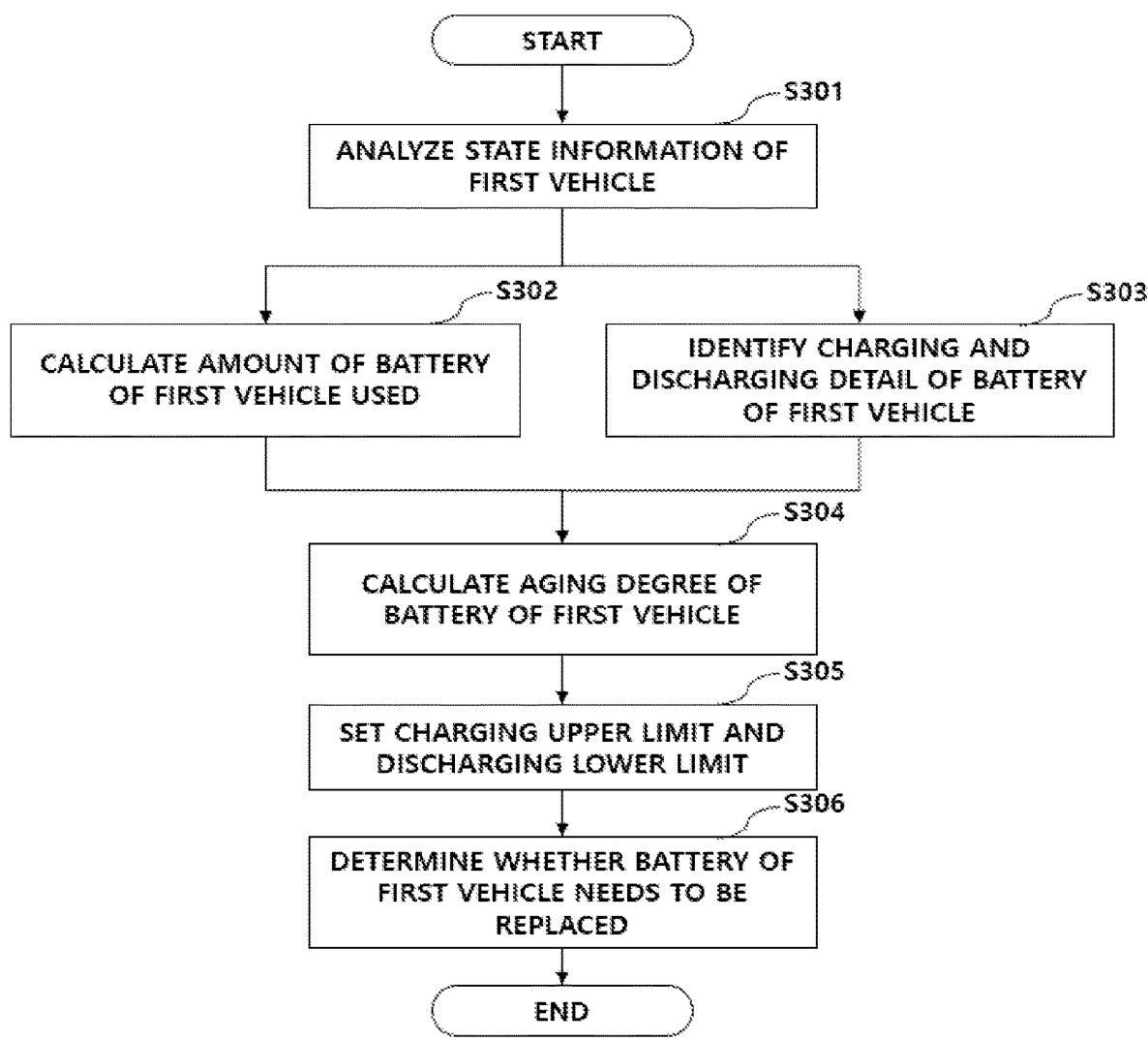
FIG. 3 is a flowchart illustrating setting a charging upper limit and a discharging lower limit through an aging degree of a battery according to an embodiment of the present invention.

FIG. 3 is a flowchart illustrating setting a charging upper limit and a discharging lower limit through an aging degree of a battery according to an embodiment of the present invention.

First, referring to FIG. 3, the control device may analyze the state information of the first vehicle, in operation S301.

More specifically, when it is identified that the first vehicle is released and returned, the control device may obtain the state information of the first vehicle, which is renewed after the first vehicle is released and returned, from the database and may analyze the obtained state information. Here, the state information of the first vehicle may include the number of times the battery is charged and discharged, the released time, a residual quantity of the battery when the first vehicle is released, the returned time, and a residual quantity of the battery when the first vehicle is returned.

The control device may compare the residual quantity of the battery identified when the first vehicle is released to the residual quantity of the battery identified when the first vehicle is returned based on the state information of the first vehicle and may calculate the amount of the battery used, in operation S302.

For example, when the residual quantity of the battery when the first vehicle is released is identified as 1000 Wh and the residual quantity of the battery when the first vehicle is returned is identified as 600 Wh, the control device may subtract the residual quantity of the battery when the first vehicle is returned from the residual quantity of the battery when the first vehicle is released and may calculate the amount of the battery used as 400 Wh.

The control device may identify detail of charging and discharging the battery based on the state information of the first vehicle, in operation S303. That is, the control device may identify the charging and discharging detail which shows the number of times the battery of the first vehicle is charged and discharged and may identify the number of times being charged and discharged through the charging and discharging detail.

The control device may estimate and calculate the aging degree of the battery of the first vehicle based on the number of times the battery of the first vehicle is charged and discharged and the amount of the battery of the first vehicle used, in operation S304.

More specifically, as the number of times the battery of the first vehicle is charged and discharged increases, the control device may estimate and calculate the aging degree of the battery of the first vehicle as high and as the amount of the battery of the first vehicle used increases, the control device may estimate and calculate the aging degree of the battery of the first vehicle as high.

That is, the control device may analyze a driving pattern of the vehicle through a usage pattern of the battery in each vehicle and may estimate and calculate the aging degree of the battery based on the driving pattern of the vehicle and a battery usage record.

The control device may set the charging upper limit and the discharging lower limit for the battery of the first vehicle based on the battery aging degree of the first vehicle, in operation S305.

More specifically, as the battery aging degree of the first vehicle rises, the control device may set the charging upper limit for the battery of the first vehicle as a low value and the discharging lower limit for the battery of the first vehicle as a high value.

That is, as the battery is aged, the control device may set the charging upper limit as a low value and the discharging lower limit as a high value and thereby, may secure safety for the aged battery.

The control device may determine whether the battery of the first vehicle needs to be replaced based on the charging upper limit and the discharging lower limit for the battery of the first vehicle, in operation S306.

More specifically, when it is identified that the charging upper limit for the battery of the first vehicle is below a reference value, the control device may determine that the battery of the first vehicle needs to be replaced. When it is identified that the discharging lower limit for the battery of the first vehicle is above a reference value, the control device may determine that the battery of the first vehicle needs to be replaced.

According to an embodiment of the present invention, the control device may set the charging upper limit and the discharging lower limit appropriately for each vehicle based on the battery information of each vehicle and the analyzed driving pattern of the vehicle and may update the set charging upper limit and the set discharging lower limit to the vehicles. Here, when the state information of a vehicle entered into the charging station is stored in the database of the control device, the cradle 100, which is the charging station, may download the state information of the vehicle to be applied in controlling charging and may update the downloaded state information to the vehicle.

Figure 4:
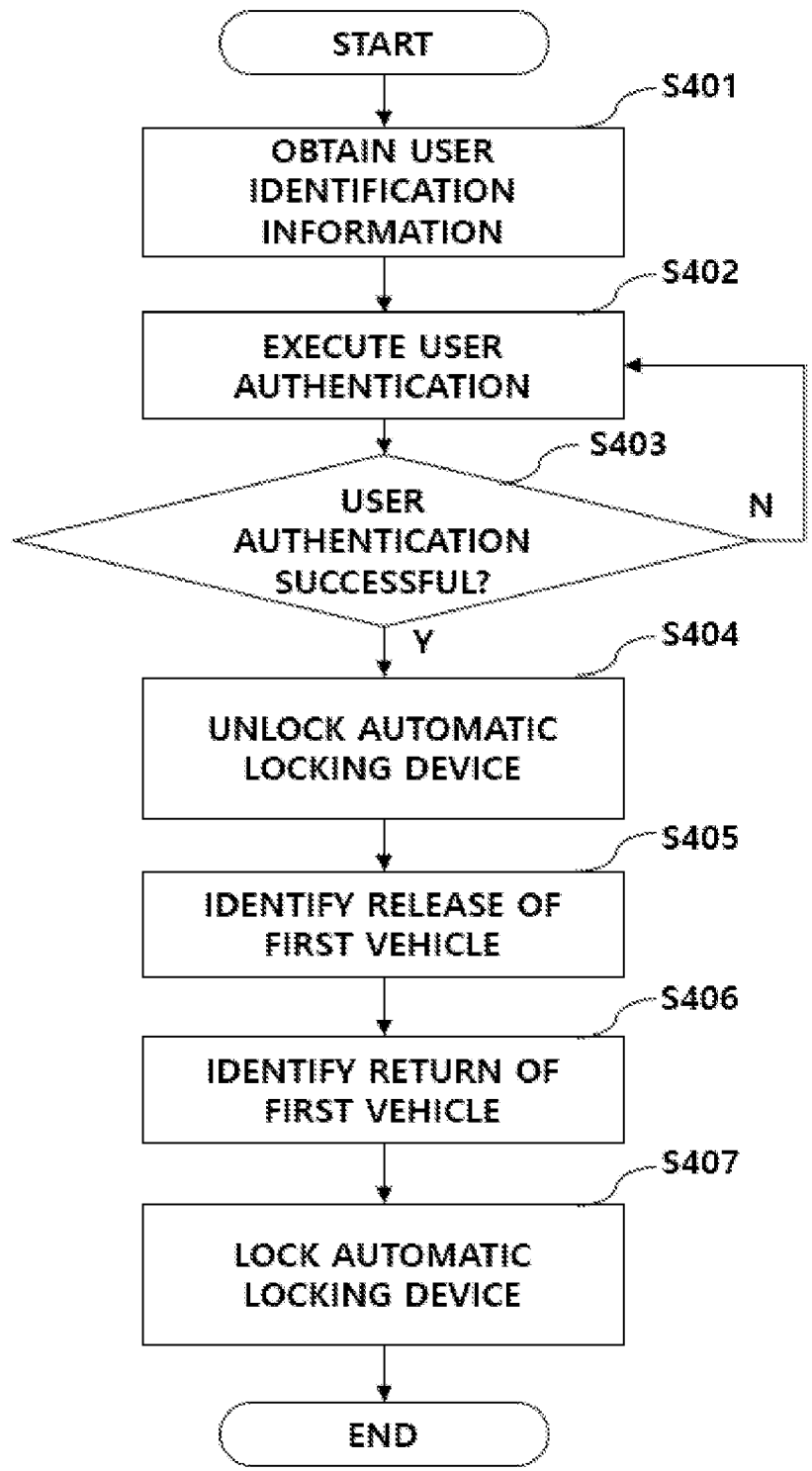
FIG. 4 is a flowchart illustrating entering and releasing a vehicle according to an embodiment of the present invention.

FIG. 4 is a flowchart illustrating entering and releasing a vehicle according to an embodiment of the present invention.

First, referring to FIG. 4, when user identification information is recognized through local area wires communication between the local area communication devices 161 and 162 and a user terminal, the control device may obtain user identification information from the local area communication devices 161 and 162, in operation S401.

More specifically, the user identification information for identifying a user by using a recognition function such as BLE, NFC, or QR included in the user terminal may be recognized in the cradle 100, wherein the cradle 100 includes a receiver for recognizing BLE, NFC, and QR installed thereto.

For example, when the first charging station is divided by each area and a user terminal approaches the first area of the first charging station, the local area communication devices 161 and 162 installed to the first area may receive user identification information from the user terminal through BLE and NFC and the control device may obtain the user identification information from the local area communication devices 161 and 162.

Also, when a QR code indicated in the user terminal is recognized by a code recognition device installed to the first area of the first charging station, the code recognition device may recognize the QR code and identify the user identification information corresponding to the QR code and the control device may obtain the user identification information from the code recognition device.

The control device may execute user authentication based on the user identification information, in operation S402.

More specifically, the control device may store identification information of users, who join members to use vehicle rental service, in the database to manage the stored identification information, may compare the user identification information obtained by using a recognition function of the user terminal such as BLE, NFC, or QR to the user identification information stored in the database, and may execute user authentication through identifying whether a matched user exists.

The control device may identify whether user authentication is successfully completed, in operation S403.

When it is identified that user authentication is failed, in operation S403, the control device may obtain the user identification information again, back in operation S401. Here, the control device may control a membership guide message for the vehicle rental service to be indicated on a display disposed in the charging station and may transmit the guide message including a link of website for subscribing the vehicle rental service to the user terminal.

When it is identified that user authentication is successful, in operation S403, the control device may control the automatic locking device 180, where the first vehicle is placed, to be unlocked, in operation S404.

The control device may identify that the first vehicle which is unlocked is released, in operation S405.

More specifically, the first vehicle placed in the first area of the first charging station is connected to the charging plug 191 installed to the first area. Here, when it is identified that the first vehicle is disconnected from the charging plug 191 and the charging plug 191 is connected to the dummy socket 192 installed to the first area, the control device may determine that the first vehicle is released and carried out.

As described above, user authentication may be executed by using the recognition functions such as BLE, NFC, and QR included in user terminals and the cradle 100 may include a receiver for recognizing BLE, NFC, and QR. When a user approaches the cradle 100 and allows the user identification information to be recognized through BLE, NFC, or QR, the automatic locking device 180 of the vehicle selected by the user is unlocked, the charging plug 191 is disconnected from the vehicle, the charging plug 191 is connected to the dummy socket 192, and then, it is identified that the vehicle is released.

The control device may identify that the released first vehicle is returned, in operation S406.

More specifically, when it is identified that the dummy socket 192 installed to the second area of the first charging station, where a vehicle is not placed, is disconnected from the charging plug 191 and the charging plug 191 is connected to the first vehicle, the control device may determine that the first vehicle is entered and returned.

That is, when the vehicle is returned to an empty area of the cradle 100 and the charging plug 191 is connected to the vehicle, it may be determined that the return of the vehicle is completed. Here, the control device may recognize the user identification information through BLE, NFC, or QR and may process that the vehicle rented by the user is returned. Also, the control device may identify that the charging plug 191 is normally connected to the vehicle, may obtain video information from a camera module installed to the cradle 100, and may complete the returning procedure of the vehicle through a video recognition process.

When it is determined that the first vehicle is returned to the second area, in operation S407, the control device may set the automatic locking device 180 installed to the second area to be locked.

Figure 5:
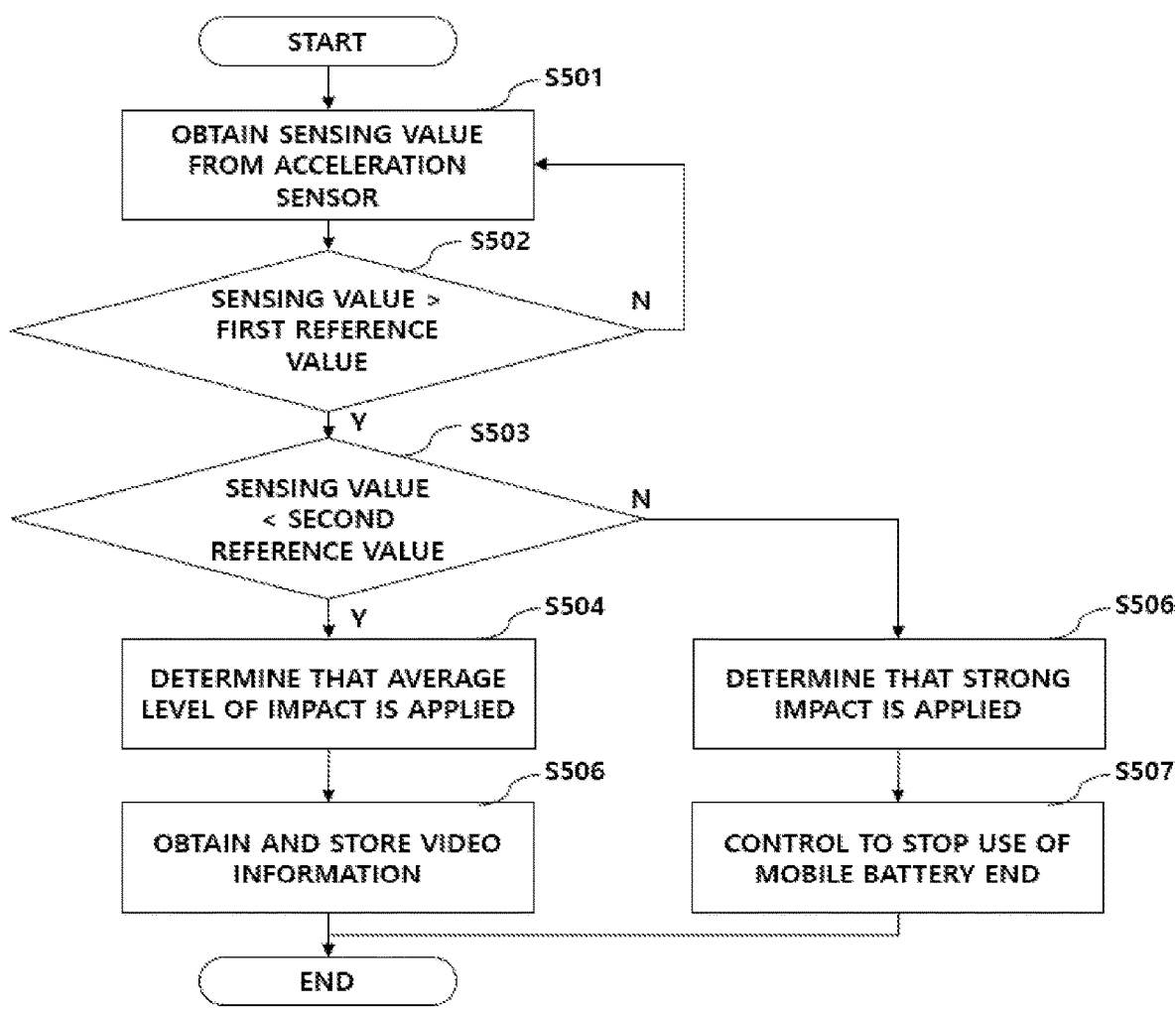
FIG. 5 is a flowchart illustrating a preparation plan when the impact is applied according to an embodiment of the present invention.

FIG. 5 is a flowchart illustrating a preparation plan when the impact is applied according to an embodiment of the present invention.

First, referring to FIG. 5, the control device may obtain a sensing value from the acceleration sensor 170 installed to the first charging station, in operation S501. Here, the acceleration sensor 170 may be attached to the mobile battery 110 and may measure acceleration changed according to the impact applied to the mobile battery 110 so as to generate a sensing value.

The control device may identify whether the sensing value is greater than a preset first reference value, in operation S502. Here, the first reference value may vary according to embodiments of the present invention.

When it is identified that the sensing value is smaller than the first reference value, in operation S502, the control device may obtain a sensing value again from the acceleration sensor 170, back in operation S501.

When it is identified that the sensing value is greater than the first reference value, in operation S502, the control device may identify whether the sensing value is smaller than a preset second reference value, in operation S503. Here, the second reference value may be higher than the first reference value.

When it is identified that the sensing value is smaller than the second reference value, in operation S503, the control device may determine that an average level of impact is applied to the first charging station, in operation S504.

When an average level of impact is applied to the first charging station, the control device may obtain video information taken around the time the sensing value is obtained and may store the obtained video information in the database, in operation S505.

For example, when it is identified that the sensing value measured by the acceleration sensor 170 is greater than the first reference value, the control device may obtain video information taken from 30 seconds before the sensing value is measured to 30 seconds after the sensing value is measured and may store the obtained video information in the database.

When it is identified that the sensing value is greater than the second reference value, in operation S503, the control device may determine that strong impact is applied to the first charging station, in operation S506.

When the strong impact is applied to the first charging station, the control device may stop the use of the mobile battery 110 installed to the first charging station and may transmit a warning message to a terminal of a manager who manages the first charging station, in operation S507.

That is, as described above, the mobile battery 110 and the control device may be connected to each other, wherein the mobile battery 110 may be replaceable and include the acceleration sensor 170 attached thereon so that impact applied while moving may be recorded and stored in the mobile battery 110. When the mobile battery 110 is withdrawn or fastened, the charging managing device 140 may communicate with the control device and may transmit records of the impact generated while moving to the control device at once. The control device may transmit impact-recorded data to a cloud server. Also, the control device may stop the use of the battery when the record of the impact is considerably serious, regardless of the transmission to a cloud server, and may provide a danger alert service.

Figure 6:
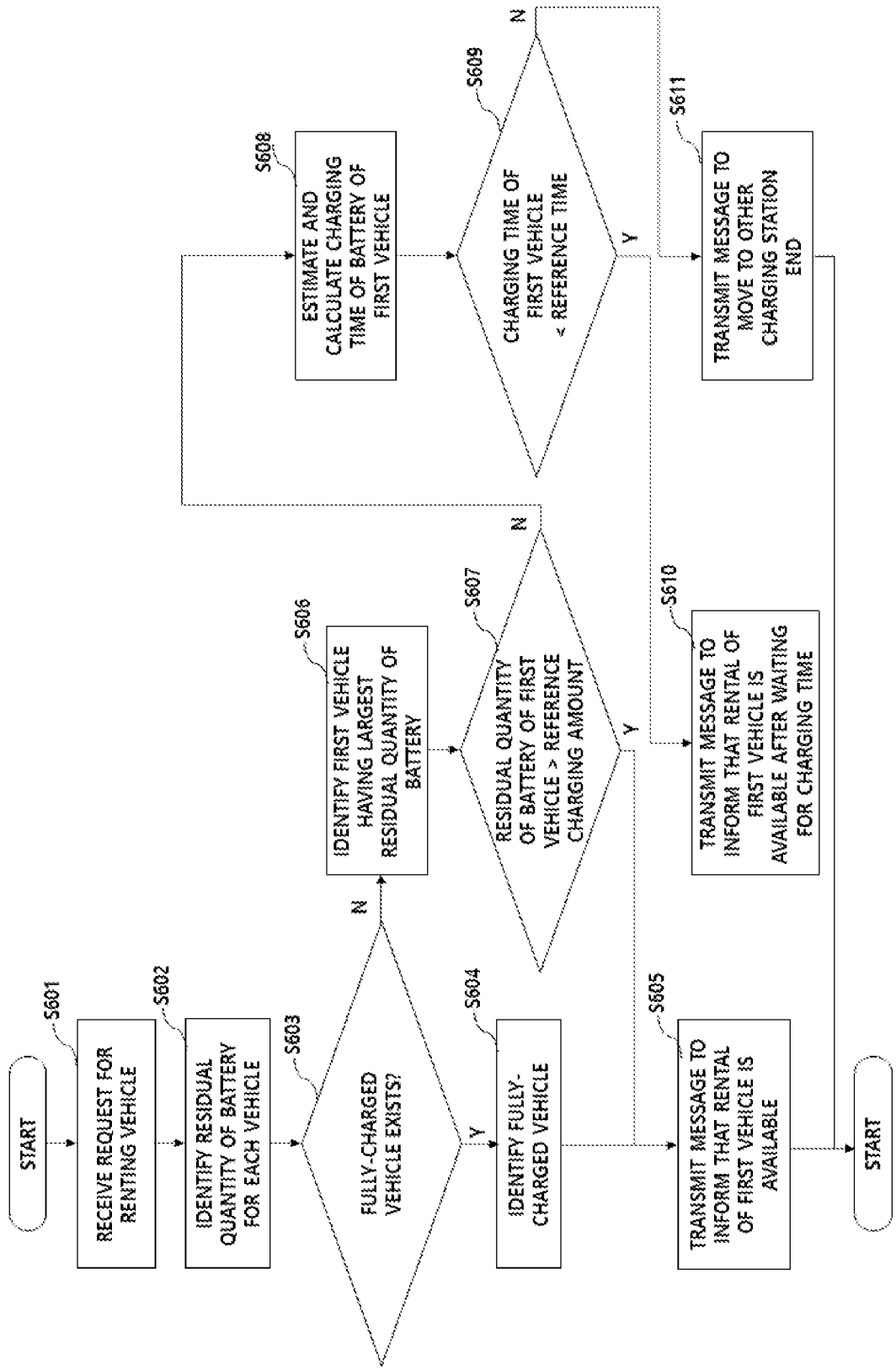
FIG. 6 is a flowchart illustrating informing a vehicle to be rented at a charging station according to an embodiment of the present invention.

FIG. 6 is a flowchart illustrating informing a vehicle to be rented at a charging station according to an embodiment of the present invention.

First, referring to FIG. 6, the control device may receive a request for renting a vehicle placed in the first charging station from a user terminal, in operation S601. That is, when the user arrives at the first charging station for renting the vehicle, the user may transmit a request for renting a vehicle to the control device through the user terminal in order to be informed of a vehicle to be rented from among the vehicles placed in the first charging station.

The control device may identify a residual quantity of battery for each vehicle placed in the first charging station, in operation S602.

The control device may identify whether a fully-charged vehicle exists, as a result of a check for a residual quantity of battery for each vehicle placed in the first charging station, in operation S603.

When it is identified that the fully-charged vehicle exists in the first charging station, in operation S603, the control device may identify the first vehicle as the fully-charged vehicle, in operation S604.

When it is identified that the first vehicle is the fully-charged vehicle, the control device may transmit a message informing that rental of the first vehicle is available to the user terminal, in operation S605. Here, the control device may transmit a message informing that the first vehicle is placed in the first area of the first charging station and may control a guide image for guiding the user to the first area from the entrance of the first charging station to be shown on a display disposed at the entrance of the first charging station.

When it is identified that the fully-charged vehicle does not exist in the first charging station, in operation S603, the control device may identify the first vehicle as the vehicle having the largest residual quantity of the battery from among the vehicles placed in the first charging station, in operation S606.

The control device may identify whether the residual quantity of the battery of the first vehicle is greater than a preset reference charging amount, in operation S607. Here, the reference charging amount may vary according to embodiments of the present invention.

When it is identified that the residual quantity of the battery of the first vehicle is greater than the reference charging amount, in operation S607, the control device determines that the first vehicle may be immediately used, even if the first vehicle is not fully-charged, and thereby, may transmit a message informing that rental of the first vehicle is available to the user terminal, in operation S605.

When it is identified that the residual quantity of the battery of the first vehicle is less than the reference charging amount, in operation S607, the control device determines that the first vehicle may not be immediately used and thereby, may estimate and calculate the charging time required for the battery of the first vehicle to reach the reference charging amount by using the residual quantity of the battery of the first vehicle, in operation S608. That is, as the residual quantity of the battery of the first vehicle lowers, it may take a long time for the battery of the first vehicle to be charged to the reference charging amount. Accordingly, the control device may estimate and calculate the charging time to be longer.

The control device may identify whether the charging time required for the battery of the first vehicle to reach the reference charging amount is shorter than the preset reference time, in operation S609. Here, the reference time may vary according to embodiments of the present invention.

When it is identified that the charging time is shorter than the reference time, in operation S609, the control device may transmit a message informing that rental of the first vehicle is available after waiting for the charging time to the user terminal, in operation S610.

For example, when the charging time required for the battery of the first vehicle to reach the reference charging amount is 5 minutes and the reference time is set to 10 minutes, the control device may transmit a message informing that rental of the first vehicle is available after waiting for the charging time of 5 minutes to the user terminal.

When it is identified that the charging time is longer than the reference time, in operation S609, the control device may transmit a message to the user terminal, wherein the message informs the user to move to the second charging station through the first vehicle to rent the second vehicle placed in the second charging station, in operation S611. Here, the control device identifies whether the first vehicle is able to move from the first charging station to the second charging station based on a residual quantity of the battery of the first vehicle. When it is identified that the first vehicle is able to move to the second charging station, the control device may transmit a message informing that rental of the second vehicle is available to the user terminal.

For example, when the charging time required for the battery of the first vehicle to reach the reference charging amount is 15 minutes and the reference time is set to 10 minutes and when it is identified that the time required to move to the second charging station adjacent to the first charging station is 7 minutes by a vehicle, the control device may not wait for the battery of the first vehicle to reach the reference charging amount and instead, may transmit a message to the user terminal, wherein the message informs the user to move to the second charging station through the first vehicle to rent the second vehicle placed in the second charging station. Here, the control device identifies a residual quantity of the battery for each vehicle placed in the second charging station. Here, when it is identified that the residual quantity of the battery of the second vehicle is greater than the reference charging amount, the control device may transmit a message to the user terminal, wherein the message informs the user to move to the second charging station.

Figure 7:
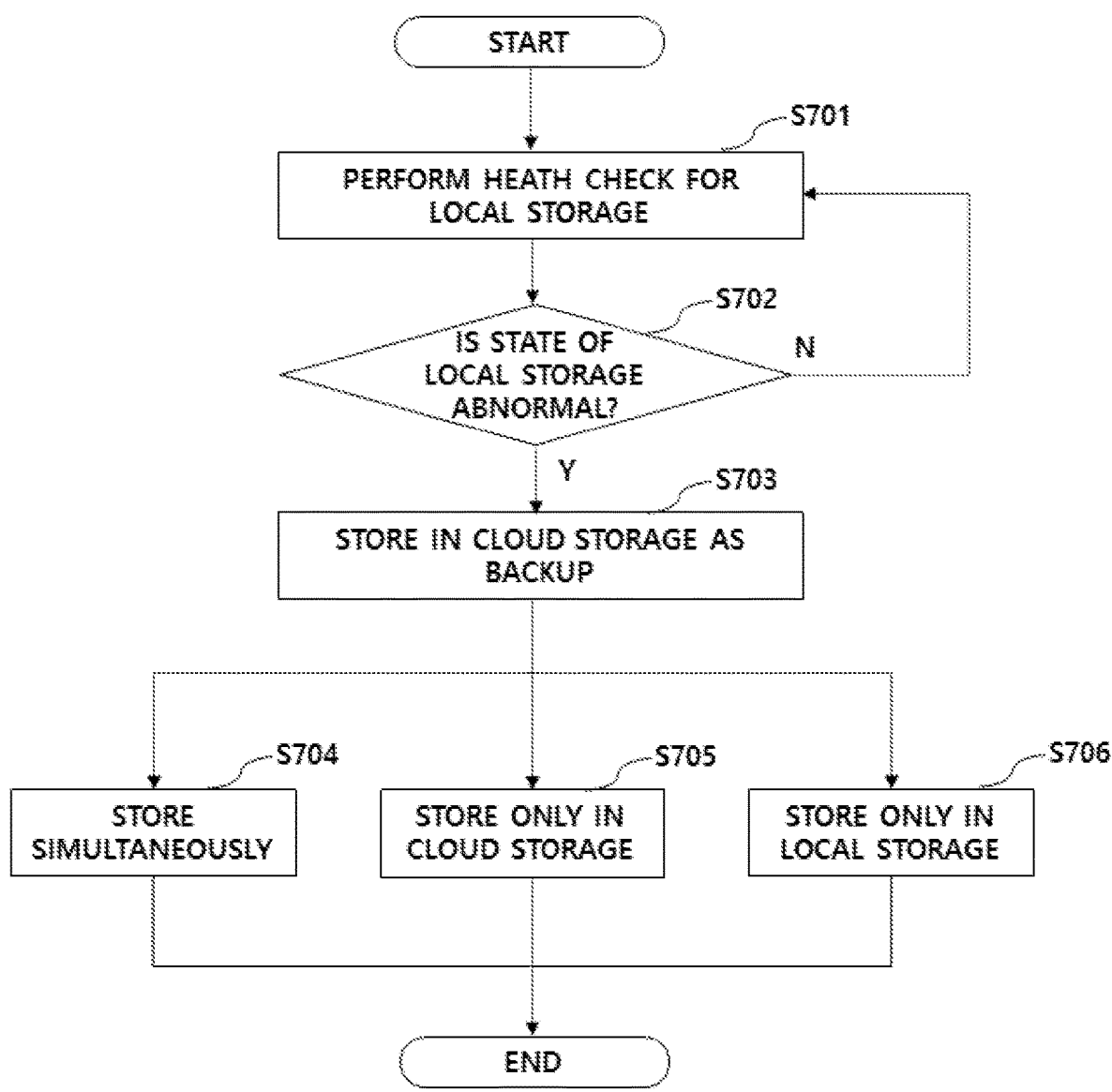
FIG. 7 is a flowchart illustrating storing information in a hybrid storage according to an embodiment of the present invention.

FIG. 7 is a flowchart illustrating storing information in a hybrid storage according to an embodiment of the present invention.

First, in order to operate the database, the control device may include a local storage or may be connected to a separate local storage.

The local storage is a storing place where the control device itself may store data without network connection.

The control device may be connected to a cloud server, wherein the cloud server provides a cloud service and may be embodied as a single server or connection of a plurality of servers.

The cloud server may be configured to execute all functions or a part of functions included in a common computer such as calculation, storing/referring, input/output, and control and may include at least one artificial neural network performing inference.

The cloud server may be configured to wired or wireless communicate with the control device.

The cloud server may include a cloud storage or may be connected to a separate cloud storage.

The cloud storage is a storing place which may be used by network connection and may be used when a storage space is not enough or data sharing is needed due to access of other devices.

In order to check a storing state of the local storage for each predetermined period, the control device may perform a health check for the local storage, in operation S701. For example, the control device may perform a health check for the local storage once in 5 seconds.

The control device may perform a health check for the local storage by checking at least one of checklist including power abnormality of the control device, defective connection, network connection, and a spare space of the local storage.

The control device may determine whether a state of the local storage is abnormal as a result of the health check, in operation S702.

For example, when the power of the control device is unstable, it may be determined that the state of the local storage is abnormal. When the connection between the control device and the local storage is defective, it may be determined that the state of the local storage is abnormal. When the network connection between the control device and an external device is unstable, it may be determined that the state of the local storage is abnormal. When the spare space of the local storage remains below 10%, it may be determined that the state of the local storage is abnormal.

When it is determined that the local storage is abnormal, in operation S702, the control device may perform duplexing so that the data stored in the local storage is stored in the cloud storage as a backup, in operation S703.

In the duplexing according to an embodiment of the present invention, the data stored in the local storage is also stored in the cloud storage and thereby, the same data may be simultaneously stored in both local storage and cloud storage.

While the duplexing is performed, the control device identifies data transmission speed between the control device and the cloud server. When it is identified that the data transmission speed is above reference speed, the control device may transmit the data stored in the local storage to the cloud server and thus, may control the data stored in the local storage to be stored in the cloud storage as a backup.

For example, when it is identified that the data transmission speed between the control device and the cloud server is 12 Mbps which is above the reference speed of 10 Mbps, the data stored in the local storage may be transmitted to the cloud server.

When it is identified that the data transmission speed between the control device and the cloud server is below the reference speed, the control device may determine whether the data of the local storage is transmitted, as a result of the health check.

More specifically, as a result of the health check, the local storage may be classified into normal state, warning state, and dangerous state. When the local storage is classified as the warning state, the control device may control the data stored in the local storage not to be transmitted to the cloud server and to wait until the data transmission speed is changed to above the reference speed.

For example, when it is identified that the data transmission speed between the control device and the cloud server is 8 Mbps, which is below the reference speed of 10 Mbps, and the local storage is classified as the warning state, the control device may maintain waiting state until the data transmission speed raises to 10 Mbps. Then, when the data transmission speed is changed to 10 Mbps, the control device may control the data stored in the local storage to be transmitted to the cloud server.

When the local storage is classified as the dangerous state, the control device may control the data stored in the local storage to be transmitted to the cloud server even if the data transmission speed is below the reference speed.

For example, when it is identified that the data transmission speed between the control device and the cloud server is 8 Mbps, which is below the reference speed of 10 Mbps, and the local storage is classified as the dangerous state, the control device may control the data stored in the local storage to be transmitted to the cloud server with low speed due to the dangerous state of the local storage, even if the data transmission speed of 8 Mbps is below the reference speed.

When it is identified that the local storage is not abnormal, in operation S702, the control device may not transmit the data to the cloud server as the state of the local storage is normal. Then, the control device may perform the health check of the local storage again, back in operation S701.

While the duplexing is performed, the control device may control data of a first file which is in a high security level not to be transmitted to the cloud server and instead, to be stored only in the local storage.

For example, when the first file having a high security level of 2 and a second file having a low security level of 1 are stored in the local storage, the control device may control the data of the first file not to be transmitted to the cloud server and instead, may control the data of the second file to be transmitted to the cloud server. Accordingly, the data of the first file may be stored only in the local storage and the data of the second file may be stored in the local storage and the cloud storage.

When the duplexing is performed to store the data in the cloud storage as a backup, in operation S703, the control device may determine whether the data is to be simultaneously stored in the local storage and the cloud storage, whether the data is to be stored only in the cloud storage, or whether the data is to be stored only in the local storage, based on the state of the local storage and a method of using files.

When it is determined that the data is to be simultaneously stored in the local storage and the cloud storage, the data stored in the local storage is stored in the cloud storage as a backup and thereby, the control device may maintain the state that the data is simultaneously stored in the local storage and the cloud storage, in operation S704.

When it is determined that the data is to be stored only in the cloud storage, the control device may delete the data stored in the local storage and may process the data to be stored only in the cloud storage, in operation S705.

More specifically, when it is identified that the spare space of the local storage is below a first reference capacity and thereby, the local storage is classified as the warning state, the control device may delete the data of the first file, which is not executed for a predetermined period of time, from the local storage and may control the data of the first file to be stored only in the cloud storage.

For example, when it is identified that the spare space of the local storage is 18 GB, which is below the first reference capacity of 20 GB, the local storage may be classified as the warning state. When the first file is not executed for 1 week, the control device may delete the data of the first file from the local storage and may control the data of the first file to be stored only in the cloud storage.

When it is identified that the spare space of the local storage is below a second reference capacity, which is below the first reference capacity, and thereby, the local storage is classified as the warning state, the control device may delete the data of the second file, which is executed less than a reference number of times for a predetermined period of time, from the local storage and may control the data of the second file to be stored only in the cloud storage.

For example, when it is identified that the spare space of the local storage is 8 GB, which is below the second reference capacity of 10 GB, the local storage may be classified as the warning state. When the second file is executed less than the reference number of times of 10 for 1 week, the control device may delete the data of the second file from the local storage and may control the data of the second file to be stored only in the cloud storage.

When it is determined that the data is to be stored only in the local storage, the control device may control the data not be transmitted to the cloud server and may process the data to be stored only in the local storage, in operation S706.

The control device may control the data of the second file, in which the number of times being changed and stored is above the reference number of times for a predetermined period of time, not to be transmitted to the cloud server and instead, to be stored only in the local storage.

For example, when the second file is changed and stored more frequently than the reference number of times of 5 for 1 week, the control device may control the data of the second file not to be transmitted to the cloud server any longer and may control the data pre-stored in the cloud server to be deleted. In this regard, the data of the second file may be stored only in the local storage. Accordingly, when the second file is changed and stored, the control device may process the data of the second file to be renewed only in the local storage.

Figure 8:
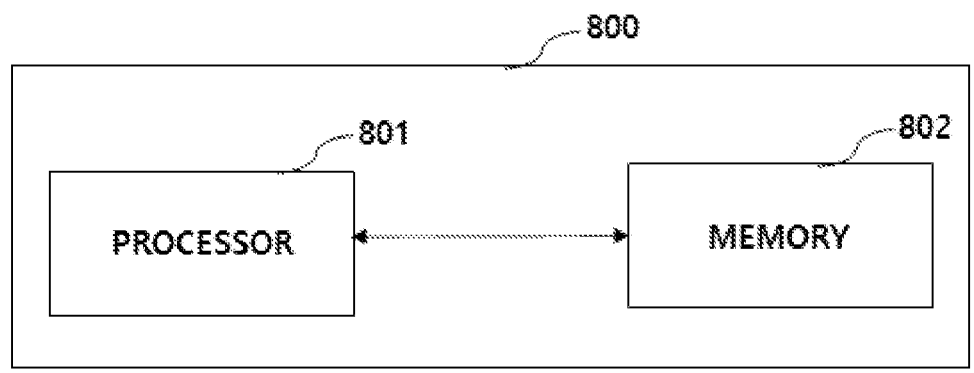
FIG. 8 is a control device according to an embodiment of the present invention.

FIG. 8 is a control device 800 according to an embodiment of the present invention.

The control device 800 according to an embodiment of the present invention includes a processor 801 and a memory 802. The processor 801 may include at least one devices described above with reference to FIGS. 1 through 7 or may perform at least one method described above with reference to FIGS. 1 through 7. A person or a group using the control device 800 may provide a service relating to the entire or a part of the methods described above with reference to FIGS. 1 through 7.

The memory 802 may store information relating to the methods described above or may store programs in which the methods described hereinafter are executed. The memory 802 may be a volatile memory or a non-volatile memory.

The processor 801 may execute programs and control the control device 800. Program codes executed by the processor 801 may be stored in the memory 802. The control device 800 may be connected to an external device (for example, a personal computer or a network) through an input/output device (not illustrated) and may exchange data through wire and wireless communication.

The embodiments described above may be implemented as a hardware component, a software component, and/or a combination of a hardware component and a software component. For example, the devices, methods, and elements described in the embodiments may be implemented by using at least one general-use computer or special purpose computer such as processors, controllers, arithmetic logic units (ALUs), digital signal processors, microcomputers, field programmable gate arrays (FPGAs), programmable logic units (PLUS), microprocessors, or any other device to execute and respond instructions. The processor may execute operating system (OS) or at least one software application executed in the OS. Also, the processor responds to the execution of the software to approach, store, control, process, and generate data. For convenience of understanding, it may be described that one processor is used, however, it will be understood by those of ordinary skill in the art that the processor includes a plurality of processing elements and/or plural types of processing elements. For example, the processor may include a plurality of processors or one processor and one controller. Also, other processing configuration is available in the processor such as a parallel processor.

The methods according to the embodiments of the present invention can be embodied as program commands executed through various computer means and recorded to a computer readable recording medium. The computer readable recording medium may include program commands, data files, and data structure, independently or combinations thereof. The program commands recorded to the computer readable recording medium may be specially designed and configured for the present invention or may be well known to one of ordinary skill in the field of computer software. Examples of the computer readable recording medium include magnetic media such as hard disks, floppy disks, and magnetic tapes, optical recording media such as CD-ROMs, and DVDs, magneto-optical media such as floptical disks, and hardware devices specially configured to store and execute program commands such as ROM, RAM, and flash memory. The program commands may include not only machine codes formed by a compiler, but also high-level language codes executed by a computer using an interpreter. The hardware devices may be configured as at least one software module for executing operations of the present invention or may be vice versa.

The software may include computer programs, codes, instructions, or a combination including at least one thereof, and may include the processor to be operated as it desires or may independently or collectively command the processor. The software and/or data may be interpreted by the processor or may be permanently or temporarily embodied to some types of machines, components, physical devices, virtual equipment, computer storage media or devices, or transmitted signal wave. The software may be dispersed on the compute system connected by network so as to be stored and executed. The software and data may be stored in at least one computer readable recording medium.

As above, the embodiments of the present invention are described with reference to the accompanying drawings, however, various technical modifications and variations may be applied by those of ordinary skill in the art. For example, although the described technologies are executed in order different from that of in methods described above and/or elements of the described system, structure, device, and circuit are connected or combined using methods different from those described above or are replaced or substituted with other elements or equivalents, an appropriate result may be accomplished.

Therefore, other implementations, other embodiments, and equivalents of claims are included in the following claims.

The invention claimed is:

1. A method of controlling charging and discharging vehicle through a charging station executed by a control device, the method comprising:
when a first vehicle placed in a first charging station is released, identifying the time the first vehicle is released and a residual quantity of the battery and renewing state information of the first vehicle;
when the first vehicle is returned to the first charging station, identifying the time the first vehicle is returned and a residual quantity of the battery and renewing state information of the first vehicle;
comparing the residual quantity of the battery identified when the first vehicle is released to the residual quantity of the battery identified when the first vehicle is returned based on the state information of the first vehicle and calculating the amount of the battery used in the first vehicle;
estimating and calculating an aging degree of the battery of the first vehicle based on the number of times the battery of the first vehicle is charged and discharged and the amount of the battery of the first vehicle used, after charging and discharging detail is identified through the state information of the first vehicle;
setting a charging upper limit and a discharging lower limit for the battery of the first vehicle based on the battery aging degree of the first vehicle; and
determining whether the battery of the first vehicle needs to be replaced based on the charging upper limit and the discharging lower limit.

2. The method of claim 1, further comprising:
when user identification information is obtained through local area wires communication between local area communication devices installed in a first area of the first charging station where the first vehicle is placed, and a user terminal, executing user authentication based on the user identification information;
when it is identified that the user authentication is successful, unlocking an automatic locking device where the first vehicle is placed;
when it is identified that a charging plug connected to the first vehicle is connected to a dummy socket installed to the first area, determining that the first vehicle is released and carried out; and
when it is identified that the charging plug connected to the dummy socket installed to the second area of the first charging station, where a vehicle is not placed, is connected to the first vehicle, determining that the first vehicle is entered and returned.

3. The method of claim 1, further comprising:
obtaining a sensing value from an acceleration sensor installed to the first charging station;
when it is identified that the sensing value is greater than a preset first reference value, determining that an average level of impact is applied to the first charging station and obtaining and storing video information taken around the time the sensing value is obtained; and
when it is identified that the sensing value is greater than a preset second reference value, determining that strong impact is applied to the first charging station, stopping the use of the mobile battery installed to the first charging station, and transmitting a warning message of the first charging station to a terminal of a manager.

* * * * *